Sept. 10, 1946.　　　C. S. WEYANDT　　　2,407,357
APPARATUS FOR CONVEYING MATERIAL
Original Filed May 1, 1939　　3 Sheets-Sheet 1

INVENTOR.
CARL S. WEYANDT.
BY Lewis D. Konigsford
ATTORNEY.

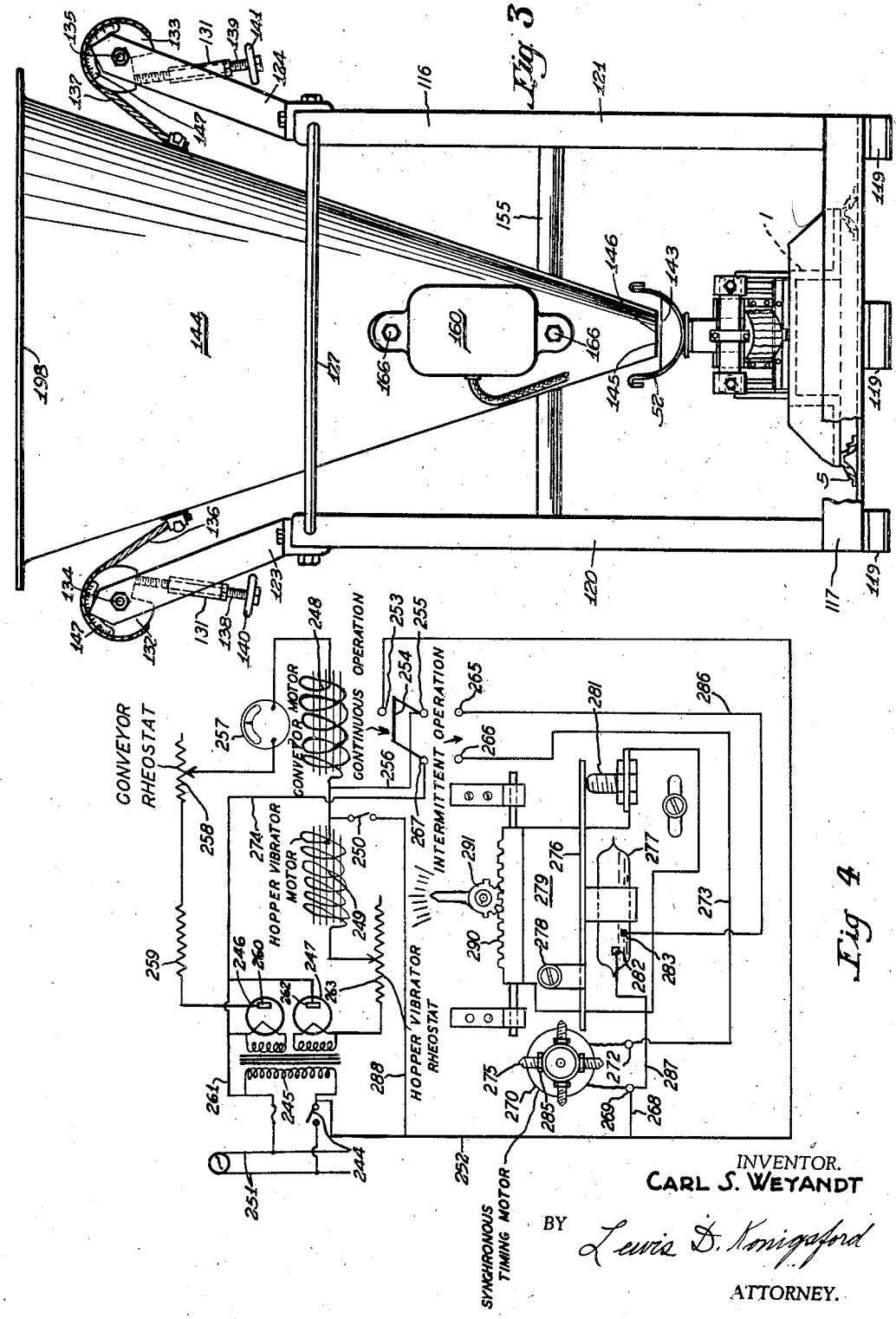

Patented Sept. 10, 1946

2,407,357

UNITED STATES PATENT OFFICE 2,407,357

APPARATUS FOR CONVEYING MATERIAL

Carl S. Weyandt, Homer City, Pa.

Original application May 1, 1939, Serial No. 270,999, now Patent No. 2,323,864, dated July 6, 1943. Divided and this application October 5, 1942, Serial No. 460,739

10 Claims. (Cl. 198—220)

This invention relates to the art of conveying or handling non-mobile or semimobile materials, such as, powders, sand, gravel, crystals or the like, and relates in particular to methods and apparatus for conveying the same in a controlled or regulated movement.

Heretofore, it has been proposed to convey finely divided materials in a vibratory conveyor trough that is supported to have vertical and horizontal components of motion. In conveying relatively free flowing materials, such as, for example, dry sand, at high rates of flow, usually no particular difficulty is encountered in maintaining the amplitude of vibration of the conveyor trough great enough to cause the materials to flow in a substantially uniform stream. However, when it is desired to convey materials at a relatively low rate of flow, even in the case of free flowing materials, it is difficult to obtain a continuous uniform flow at the amplitude of vibration normally required for such low flow. Or stated differently, a minimum amplitude of vibration of the conveyor trough is necessary to cause the material to be conveyed uniformly, and below this minimum amplitude materials will not be conveyed at all, or will be conveyed erratically, depending on the nature of the materials. However, at this minimum the rate of flow may be higher than desired for a particular purpose.

According to the present invention, I convey or feed finely divided materials on a vibratory conveyor at rates lower than the minimum continuous rate that can be maintained for the particular material, by vibrating the conveyor for a short period at an amplitude of vibration above the minimum continuous rate and having the conveyor quiescent in the intervals. The duration of the quiescent period and of the vibration period (which I call the cycle of operation) may be adjusted as desired to obtain the desired average rate of feed over the entire cycle of operation. This method may be employed to convey free flowing materials or difficultly flowing materials which have a tendency to cake or agglomerate or flocculate.

The apparatus employed in carrying out this method preferably comprises a conveyor trough mounted to vibrate with vertical and horizontal components of motion and a vibratory electrical motor connected to the conveyor trough to vibrate the same, an electrical current supply to actuate the motor and a timing switch between the current supply and the motor for controlling the duration of vibration and quiescence.

It is an object of the present invention to provide a novel apparatus and method for feeding, handling or conveying finely divided materials at a controlled or uniform rate, which may be varied through a wide range.

Another object is the provision of automatic control means to maintain the rate of feed of a vibratory conveyor at a continuous or at an intermittent rate.

Another object is to provide apparatus and process for feeding or conveying finely divided materials at a relatively slow rate while obtaining a substantially uniform feed.

Still another object is the provision of a vibratory conveying apparatus which may be operated intermittently for slow feeds of hygroscopic or damp materials and may be continuously operated for easy flowing materials at high or low rates of flow, and to the method of conveying such materials.

These and other objects will be apparent from a consideration of the following specification taken in connection with the accompanying drawings, wherein is illustrated the preferred embodiment of the invention by way of example and wherein:

Figure 3 is an end view of Figure 2, and

Figure 4 is a wiring diagram showing the operation of the apparatus and method.

Figure 1:
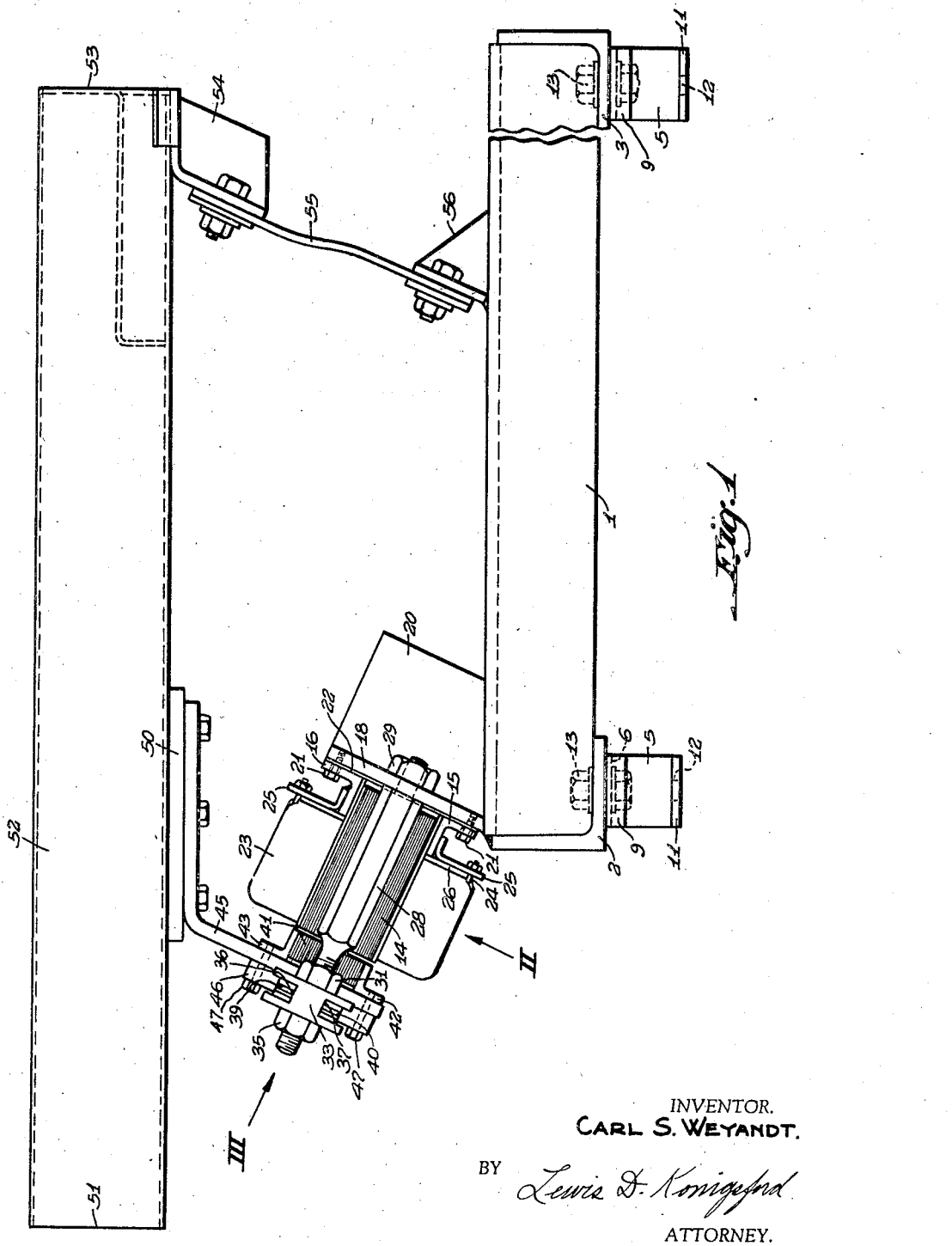
Figure 1 is a side elevation view of a preferred embodiment of the invention.

The apparatus illustrated in the drawings is described in my Patent No. 2,187,717, issued January 23, 1940, on an application filed October 21, 1936, and will not be described herein in minute detail. The present application is a division of the application that issued as Patent No. 2,323,864 on July 6, 1943, for Vibratory feeder, which in turn is a continuation in part of the application that issued as Patent No. 2,187,717.

Referring to the drawings, the numeral 1 designates a base of any suitable construction, which as shown, is of inverted channel shape, and has horizontal flanges 2 and 3 at its ends. The base preferably is made massive and is bolted or otherwise secured to suitable resilient vibration absorber or dampener elements 5 which rest on the floor. The vibration absorbers 5 each comprise an inverted channel strip 6 with a hole bored or punched therethrough, and having rubber pads 9 vulcanized or otherwise secured thereto on one of their faces respectively. To the opposite faces are secured angle plates 11 having holes 12 formed therein by which the vibration absorbers may be bolted to the floor, if desired. The base 1 is secured to the channel strip 6 by bolts 13.

An electromagnet assembly comprises a core 14 in the shape of an E built up of laminated soft iron plates located between two angle bars 15 and 16, and riveted thereto to hold them in assembled relation. Two brackets or plates 18 having the reenforcing flanges 20 thereon are formed integral with the base 1, and the magnet core 14 is secured to the plates 18 in spaced relation thereto by bolts 21 passing through the angle bars 15 and 16 and threaded into these brackets, a spacing plate 22 being interposed therebetween to determine the normal air gap. A coil 23 of wire surrounds the middle leg of the magnet core and is secured in position by suitable clips 24 passing through the angle plates 25 which may be welded or otherwise secured to angle bars 15 and 16, a resilient pad 26 of rubber or other suitable material being interposed between the coil and magnet base.

At the ends of the electromagnet two hexagonal side bars 28 of non-magnetic material, such as, non-magnetic stainless steel, are bolted to the brackets 18 by nuts 29 threaded onto the reduced lower ends of the bars. The upper ends of bars 28 are reduced and threaded to receive adjusting nuts 31 thereon, and the spring supports 33 have holes therein through which pass the reduced threaded ends of the side bars. The spring support 33 is adjustably held in position on nut 31 by lock nut 35.

The spring holders 33 are bifurcated and receive the prongs 39 and 40 of the spring 38 which is bifurcated at its ends. The spring 38 is shown as a laminated leaf or bar spring, but it may have any other suitable form, and may be composed of as many laminations as desired to give it the required stiffness or flexibility and strength. It will be observed that the ends of spring 38 are loosely supported in the spring holders 33 so that the ends are free to move axially in the spring supports.

The armature assembly comprises a bar 41 built up of laminated plates which are held in assembled relation between the angle plates 42 and 43 by means of rivets passing therethrough. A motion transmitting or connecter member 45 is secured to the angle plates 42 and 43 in spaced relation to the armature bar 41 in any suitable manner, as by welding thereto, and the assembly comprising the armature 41, angle plates 42 and 43, and motion transmitting member 45 are secured to the spring 38 by a recessed clamp bar 46 and bolts 47 passing through the clamp bar and threaded into the motion transmitting member 45 and angle plates 42 and 43.

In the preferred structure shown, the motion transmitting member 45 is angle shaped and is bolted to a plate 50 welded to the bottom adjacent the open end 51 of conveyor trough 52. The opposite closed end 53 of the conveyor trough 52 has a bracket 54 welded or otherwise secured thereon to which is suitably bolted one end of a leaf spring 55, the other end of the spring being suitably bolted to a bracket 56 which may be integral with the base 1. The spring 55 supports and guides one end of the conveyor trough so that it will be capable of vibratory motion. However, it will be understood that the rear end of the trough may be mounted for substantially horizontal movement in any other suitable manner. The spring holders 33 are movable longitudinally along the side bars 28 by adjustment of nuts 31, 35 and it will be seen that when the spring holders are adjusted downward it tends to unbias spring 55 and moves the armature 41 toward the electromagnet 14 to reduce the air gap therebetween. This adjustment decreases the natural period of vibration of the conveyor trough, armature and springs 38 and 55. After the conveyor mounting has been adjusted to the desired natural period the air gap may be adjusted by changing plate 22 to one of suitable thickness, a thinner plate increasing the air gap, and a thicker one decreasing the air gap. Also, by changing the number of leafs in the spring 38 or spring 55 the stiffness of the conveyor mounting and therefore its natural period of vibration, may be preselected. It will also be observed that the trough 52 and the material therein being moved are above the spring and motor so that when material is added to the trough the tendency of this increased weight is to deflect the spring 38 toward the electromagnet and decrease the air gap and if the air gap is originally selected to allow for such deflection without having the armature strike the electromagnet, the amplitude of vibration of the trough will be increased.

The operation of the apparatus now will be described. When an alternating or intermittent pulsating current is passed through coil 23 the electromagnetic force set up in the magnet 14 attracts the armature 41 against the resilient resistance of inclined springs 38 and 55, and when the current wave dies down sufficiently the inertia of the moving parts continues the motion until the builtup restoring force in the springs gradually reverses the motion and retracts the armature and thus moves the trough 52 which is connected thereto. If the natural period of the inclined springs is properly selected or adjusted to be less than the recurrence period of the electromagnetic impulses, on continued flow of current through the solenoid a non-impact vibratory differential motion of relatively large amplitude of the armature, trough and spring is set up, and any material placed on the trough, such as sand, powder, or articles of any kind, will be conveyed continuously in one direction. Due to the axis of vibration of the armature being at an angle to the bottom of the conveyor, I believe the action to be one of successively rapidly withdrawing the conveyor from under the particles of material in one direction and more slowly returning the conveyor to pick up the particles of material at a different point thereon and move them ahead.

Figure 2:
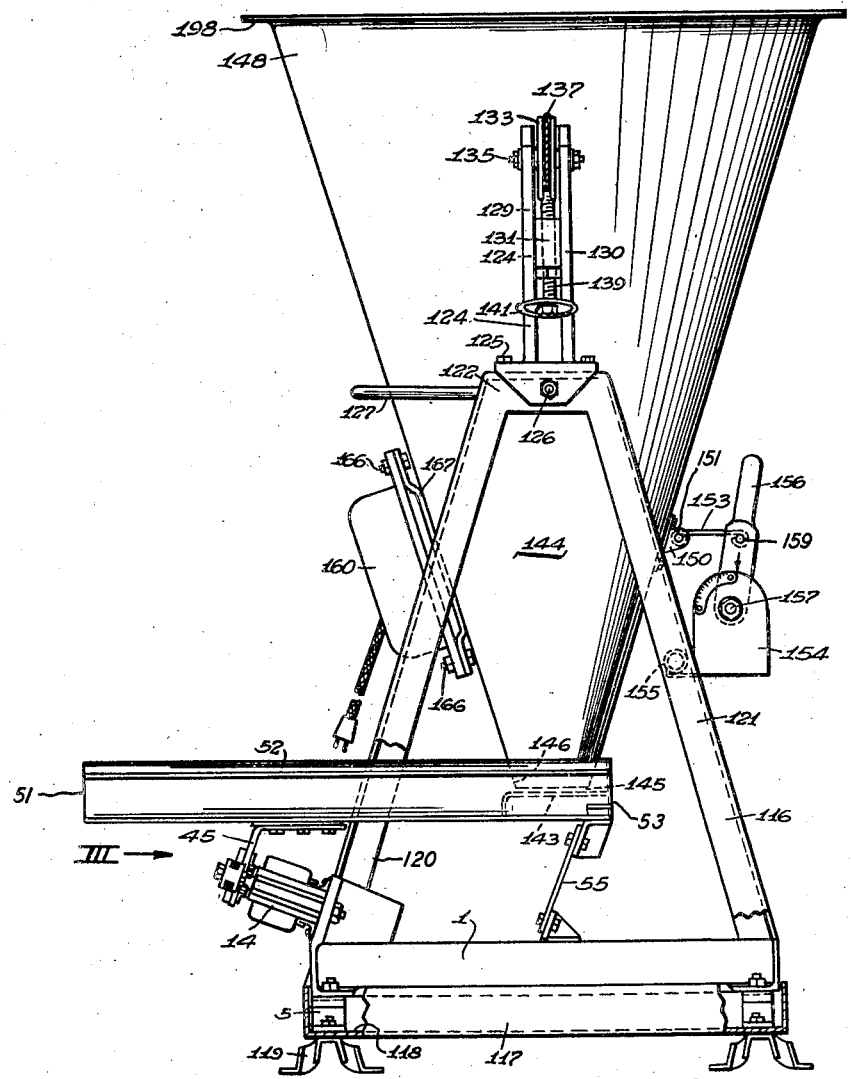
Figure 2 is a side view of a modification.

In the embodiment shown in Figures 2 and 3, I have illustrated a preferred form of apparatus which I designate as a feeding machine. In this embodiment, wherein like parts are designated by the same reference numeral, a frame designated generally by the numeral 116 is made up of angle bars welded or otherwise suitably secured together. The bottom of the frame is made of four angle bars 117 with one face 118 turned inward and the other face vertical, and the conveyor base 1 is suitably supported on the inwardly turned faces 118 thereof. The conveyor base 1 is set on the vibration absorbers 5, of which any desired number may be employed, so that the vibrations of the base 1 are not transmitted to the frame 116. The frame 116 is also set upon vibration absorbers 119 which are like the vibration absorbers 5, and serve to prevent vibrations in the floor from affecting the frame or the members supported thereon.

The frame 116 has two pairs of side members 120 and 121 which have cross pieces 122 at their upper ends, and support the hopper brackets 123 and 124 thereon. As the two hopper brackets are constructed alike only one will be described in detail. The bracket 124 has an inverted L-shaped foot which is bolted to the cross piece 122 at the top by bolts 125 and at the sides by bolt 126. A curved bar or pipe 127 connects the two side members 120 and 121 of the frame to provide a reenforcement for the top portion thereof. The upright part of the hopper bracket 124 is bifurcated to form spaced bars 129 and 130 between which is welded or otherwise secured the inclined internally threaded sleeve 131. Segmented grooved pulleys 132 and 133 are rotatably journalled on bolts 134 and 135 passing through suitable transverse holes in the upper ends of bars 129 and 130, and cables 136 and 137 are secured to the respective pulleys at one end thereof by suitable clamps, the other ends thereof being clamped to the wall of conical hopper 144. Adjustment screws 138 and 139 are threaded through threaded sleeves 131 with their ends abutting one segmental face of the pulleys 132 and 133 respectively. The other ends of screws 138 and 139 carry hand wheels 140 and 141. As shown in Figures 1, 2 and 3, the conveyor trough 52 has a rounded bottom, and I provide a suitable table or platform 143 near the closed end of the trough. It will be apparent that the hopper 144 is supported by the cables 136 and 137 with its smaller end over the table 143, and it will be apparent that by rotating pulleys 132 and 133 the hopper may be raised or lowered with respect to the table 143. The space 145 between the end 146 of the hopper and the table 143 constitutes a controllable feed opening, which may be varied by varying the hopper with respect to the table. The ends of the bars 129 and 130 may be pointed to cooperate with suitable graduations 147 on the pulleys to insure correct adjustment thereof.

Material is introduced into the hopper 144 at its larger end 148 and is discharged from the hopper onto the conveyor trough 52 through the feed opening 145, the conveyor acting as a vibratory gate and the reciprocations of the conveyor chute 52 carry the material along and discharge it from the open end thereof in a continuous stream into any suitable tank or receptacle.

A clevis block 150 secured to the hopper has a bolt 151 therein about which is located a grooved rubber grommet (not shown), one end of rod 153 being swivelled about this grommet. A clevis bracket 154 is welded or otherwise secured to the cross piece 155 of the frame 116. The adjustment handle 156 is in the form of a U and a bolt 157 passing through the base of the U and through the clevis bracket 154 serves as a pivot for the handle 156. A second grommet (not shown) is located on a bolt 159 passing through the arms of the U handle 156, and the other end of rod 153 is looped over the second grommet. A nut on the end of bolt 157 clamps the handle 156 in adjusted position. By means of this construction, by pivoting the handle 156 about its axis 157 the hopper may be tilted from the vertical as desired to adjust the feed opening 145 from the end or from the top surface of table 143. The clevis bracket 154 is calibrated, and the index mark on the handle 156 cooperates therewith to insure correct setting of the hopper.

To overcome any tendency of the material in the hopper 144 to form a bridge or clog the hopper, I provide a self-contained electrically operated vibrator, designated generally by the numeral 160, which is described in detail and claimed in my Patent No. 2,206,244, issued July 2, 1940, and need not be described here in detail.

A plate 167 is secured to the hopper 144 and bolts 166 pass through the plate 167 and suitable bosses or extensions on the base of the vibrator to secure the vibrator to the hopper. The vibrator contains an electromagnet and an armature resiliently supported by the vibrator base.

In Figure 4 I have shown an electrical diagram for continuously or intermittently operating the vibratory conveyor, the hopper vibrator and conveyor motor preferably being operated by complementary half waves of a rectified alternating current source. Upon closing the filament excitation switch 244, the primary coil of heater transformer 245 receives current from any suitable alternating source, which may be commercial power lines 251, the filaments of the thermionic valves 246 and 247 being heated by the secondary coils of the transformer, the cathodes and anodes of tubes 246 and 247 being interconnected to produce two series of direct current impulses. The conveyor vibratory motor is designated by the inductance 248, and the hopper vibrator motor by the inductance 249. One half wave of circuit is through switch 244,. lead wire 252 to the terminal 253 of switch 254. When it is desired to operate the vibratory conveyor and hopper motor continuously the switch 254 is thrown to connect terminals 253 and 255 and switch 250 is opened, the current wave passing by lead 256 through inductance 248, through the ammeter 257, the rheostat 258 and fixed resistance 259 through the anode 260 of the thermionic valve 246. This thermionic valve only allows one half wave to pass therethrough. The other half wave circuit is through the lead wire 261, through the anode 262 of the thermionic valve 247, thence through calibrated rheostat 263 and inductance 249, by lead 256 to switch contact 255, thence through switch 254 to contact 253 and through wire 252 and switch 244 back to power wire 251.

When it is desired to operate the reciprocatory conveyor intermittently, the switch 254 is moved to contact terminals 265 and 266. In this position of the switch, the current circuit is through lead 252 and lead 268 to the terminal 269 of the synchronous motor 270; and from the other terminal 272 thereof through lead 273 to the switch contact 266, through the switch 254 to terminal 267 and from thence by leads 274 and 261 to the power wire 251 of the alternating current source. The synchronous motor 270 therefore is in continuous operation at an accurate chronometric speed in this position of the switch.

The synchronous motor 270 drives a timing member shown diagrammatically having a plurality of projecting threaded switch actuator pins 275, shown as four in number. However, any desired number of actuator pins may be employed. The actuator pins 275 are adapted to engage a support 276 for a mercury switch 277 which is pivotally supported at 278 on a panel 279, and when an actuator pin 275 engages the end of support 276 the support is tilted downward thus causing the mercury to flow to the left and establish communication between the electrodes 282 and 283 of the mercury switch. When the actuator pin 275 passes the supports 276 the weight of the support returns it to the position shown resting on the adjusting screw 281. The actuator pins 275 may be adjusted to compensate for wear by loosening lock nut 285 thereon, threading the actuator into or out of the supporting ring as desired, and again tightening the lock nut.

In the position of the mercury switch 277 shown in Figure 4 and with switch 254 in intermittent operation position, the mercury switch is open and no current flows through the inductances 248 and 249. When the mercury switch is in tilted position one half wave flows from the rectifier tube 247 through rheostat 263, inductance 249 to switch terminal 255 and through the switch 254 to terminal 265, thence through lead wire 286 to electrode 283, through the mercury to electrode 282, thence by lead wires 287, 268 and 252 to the main conduit. Similarly, the other half wave circuit is from main conduit 251, through leads 252, 268 and 287 to the mercury switch 277 thence by lead 286 to the switch 254, and thence through lead 256 to inductance 248 and ammeter 257 to rectifier tube 246.

As long as the actuator pins 275 maintain the switch support 276 in tilted position alternate half waves of rectified current will flow through the inductances 248 and 249 to operate the reciprocatory conveyor and the hopper vibrator respectively. As there are four actuator pins 275 and if the synchronous motor rotates them once in each minute, there will be four periods of operation of the vibratory conveyor and hopper vibrator and four periods of idleness in every minute. The duration of each period of operation can be determined by sliding the panel 279 horizontally so as to govern the distance by which support 276 extends into the path of the actuator pins 275. The further this support extends into the actuator pin path the longer will be the operative periods of the conveyor and hopper vibrator. Preferably, the timing is such that the circuit is opened during periods of zero current. Thus, in the case of a sixty cycle alternating current, if the interruption occurs four times per minute it will be after the nine hundredth, eighteen hundredth, twenty seven hundredth and thirty six hundredth pulsation in that particular minute. The calibration means for the switch comprises a rack 290 and a gear wheel 291 in mesh therewith and carrying an indicator which shows the position of the switch support with relation to the actuators in time units of contact.

If desired, the hopper vibrator motor may be operated continuously, and the conveyor motor operated intermittently. This is accomplished when the switch 254 is moved to intermittent operation position and switch 250 is closed. With this arrangement current flows continuously through the hopper vibrator motor circuit comprising anode 262, rheostat 263, inductance 249, switch 250, lead wire 288 and lead wire 252. The operation of the conveyor motor is as previously described with the switch 254 in intermittent operation position.

In operating the feeder machine, the line switch 244 is first closed to heat the filaments of the thermionic tubes 246 and 247, the switch 254 is thrown to the desired position, and switch 250 is also thrown to open or closed position as desired. The amplitude of vibration of the conveyor is governed by adjustment of the rheostat 258 which governs the current supplied to the coil of the conveyor motor, and the amplitude of vibration or force of vibration of the hopper vibrator is governed by adjustment of the rheostat 263 which preferably is calibrated. The ammeter 257, which indicates the setting of the rheostat 258, may be calibrated to show the rate of feed in units of weight or volume per unit of time. The continuous operation system is utilized for all rates of feed of certain materials which are easily handled, and the intermittent operation system is utilized principally for very low rates of feed below the rate at which a continuous feed can be maintained at a uniform rate. For example, a machine built according to the modification shown in Figure 2 is capable of feeding at the rate of a few ounces per hour up to several thousand pounds per hour, depending on the nature of the material being handled. This universal ability of the machine is illustrated in the following table of rates of feed for a given machine:

| Material | Per hour min. rate | Per hour max. rate |
|---|---|---|
| | Pounds | Pounds |
| Sand | 1 | 10,000 |
| Pebble lime | 2 | 4,000 |
| Alum | ½ | 800 |
| Soda ash | ½ | 600 |
| Activated carbon | ½ | 100 |

The above ratings are conservative and the feeder machine may be operated in many instances below the above minimum rates or above the maximum rates, and may be operated at any desired rate of feed between the above limits.

When it is desired to operate the feeder machine at an intermittent rate, the calibration means 291 is set for the desired duration of operation, and the switch 254 is thrown to the intermittent operation position so as to operate the conveyor motor and hopper vibrator motor intermittently for the duration as determined by the setting of calibration means 291. In the case of some materials that are difficult to handle, it may be desired to operate the hopper vibrator continuously, and the conveyor intermittently, and for this purpose the switch 250 is opened.

It will be understood that in place of the thermionic valves 246 and 247, and their heating circuits, any other type of rectifier may be employed, and that the conveyor may be employed alone or in conjunction with the hopper.

What I claim as my invention and desire to secure by United States Letters Patent is:

1. In apparatus for conveying material, the combination of a vibratory conveyor, and continuously operated interrupter means for intermittently interrupting the vibrations to cause the conveyor to deliver a series of separate quantities of material in a selected period of time the total mass of which provides an abnormally low feed that is below the lowest rate of continuous feed of which the conveyor is capable in the same period of time.

2. In apparatus for conveying material, the combination of a vibratory conveyor, continuously operated interrupter means for intermittently interrupting the vibrations to cause the conveyor to deliver a series of separate quantities of material, and means for regulating the mass of material in the individual quantities to provide an abnormally low feed that is below the lowest rate of continuous feed of which the conveyor is capable in the same period of time to produce a selected total feed during the selected period of time.

3. In apparatus for conveying material, the combination of a vibratory conveyor, continuously operated interrupter means for intermittently interrupting the vibrations to cause the conveyor to deliver a series of separate quantities of material, and means for regulating the time intervals between the individual quantities to provide an abnormally low feed that is below the lowest rate of continuous feed of which the conveyor is capable in the same period of time to produce a selected total feed during the selected period of time.

4. In apparatus for conveying material, the combination of a vibratory conveyor, continuously operated interrupter means for intermittently interrupting the vibrations to cause the conveyor to deliver a series of separate quantities of material, and means for regulating the mass of material in the individual quantities and also regulate the time intervals between the individual quantities to provide an abnormally low feed that is below the lowest rate of continuous feed of which the conveyor is capable in the same period of time to produce a selected total feed during the selected period of time.

5. In apparatus for conveying material, the combination of a vibratory conveyor, a continuously operated interrupter means for periodically interrupting the vibrations of the conveyor to cause it to deliver a series of separate quantities in a predetermined period of time the total quantity of which provides an abnormally low feed that is below the lowest rate of continuous feed of which the conveyor is capable in the same period of time.

6. The structure of claim 5 characterized in that the series of separate quantities are uniform in amount and are equally spaced.

7. The structure of claim 5 which also includes means for changing the periods of operation of the interrupter means to change the average flow of material.

8. The structure of claim 5 characterized in that the interrupter means includes a synchronous motor and provides a total feed that is more accurate in a given period of time than the lower rates of continuous feed of the conveyor.

9. The structure of claim 5 which also includes means to change the periods of operation and quiescence of the interrupter means to change the quantity of material delivered in a given period of time.

10. In apparatus for conveying material, the combination of a vibratory conveyor, a synchronous interrupter means for periodically interrupting the vibrations of the conveyor to cause it to deliver a series of separate quantities in a predetermined period of time, the total quantity of which provides an abnormally low feed that is below the lowest rate of continuous feed of which the conveyor is capable in the same period of time, and means to change the periods of operation of the synchronous interrupter means to change the quantity of the material delivered in a given period of time.

CARL S. WEYANDT.